US009170799B2

(12) United States Patent
Barthel et al.

(10) Patent No.: US 9,170,799 B2
(45) Date of Patent: *Oct. 27, 2015

(54) ACCURATELY ESTIMATING INSTALL TIME

(71) Applicant: International Business Machines Corporation, Armonk, NY (US)

(72) Inventors: Rand K. Barthel, Mendon, MA (US); Yong Li, Newton, MA (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/150,339

(22) Filed: Jan. 8, 2014

(65) Prior Publication Data

US 2014/0123128 A1 May 1, 2014

Related U.S. Application Data

(63) Continuation of application No. 13/342,567, filed on Jan. 3, 2012, now Pat. No. 8,661,431.

(51) Int. Cl.
*G01R 21/00* (2006.01)
*G01R 21/06* (2006.01)
(Continued)

(52) U.S. Cl.
CPC ........................................ *G06F 8/61* (2013.01)

(58) Field of Classification Search
CPC ............... G06F 8/36; G06F 8/60; G06F 8/61; G06F 8/65; G06F 8/68; G06F 8/71; G06F 8/72; G06F 8/73; G06F 11/1662; G06F 11/2025; G06F 11/2028; G06F 11/2041; G06F 11/2046; G06F 21/85; G06F 17/30289
See application file for complete search history.

(56) References Cited

U.S. PATENT DOCUMENTS 5,628,013 A    5/1997    Anderson et al.
5,805,898 A *  9/1998    Barsness et al. ............. 717/175
(Continued)

FOREIGN PATENT DOCUMENTS

CN    1760833       4/2006
JP    2000276454    10/2000
WO    2008076530    6/2008

OTHER PUBLICATIONS

"International Application No. PCT/IB2012/057289 International Search Report", May 16, 2013 , 8 pages.
(Continued)

*Primary Examiner* — Don Wong
*Assistant Examiner* — Anibal Rivera
(74) *Attorney, Agent, or Firm* — DeLizio Law, PLLC

(57) ABSTRACT

Timing parameters that influence an install time interval for installing a product on computing machines in a test environment in accordance with an installation configuration option are identified. A test value of the timing parameter and a test value of the install time are determined for each of the computing machines. The test values of the timing parameter and the install time determined for the sample computing machines are analyzed to determine an install time calculation expression for the installation configuration option. For installation in accordance with the installation configuration option in a normal operating environment, a current value of each of the timing parameters of the predetermined install time calculation expression for the installation configuration option. The install time interval in the normal operating environment is estimated based on the current value of the timing parameters and the install time calculation expression.

20 Claims, 6 Drawing Sheets

(51) Int. Cl.
*G06F 9/44* (2006.01)
*G06F 9/45* (2006.01)
*G06F 9/445* (2006.01)

(56) References Cited

U.S. PATENT DOCUMENTS

| | | | |
|---|---|---|---|
| 5,960,206 A | 9/1999 | Barsness et al. | |
| 7,437,704 B2 * | 10/2008 | Dahne-Steuber et al. | 717/100 |
| 7,770,167 B1 * | 8/2010 | Weathersby | 717/174 |
| 7,802,083 B2 * | 9/2010 | Gurumoorthy et al. | 717/177 |
| 8,495,592 B2 * | 7/2013 | Fawcett et al. | 717/130 |
| 2003/0023966 A1 * | 1/2003 | Shimizu et al. | 717/175 |
| 2003/0074379 A1 | 4/2003 | Keohane et al. | |
| 2005/0050526 A1 * | 3/2005 | Dahne-Steuber et al. | 717/136 |
| 2008/0154805 A1 | 6/2008 | Gurumoorthy et al. | |
| 2008/0263511 A1 * | 10/2008 | Shapiro | 717/104 |
| 2009/0150878 A1 | 6/2009 | Pathak et al. | |
| 2009/0187822 A1 * | 7/2009 | Abreu et al. | 717/126 |
| 2010/0262380 A1 * | 10/2010 | Matievich et al. | 702/104 |
| 2011/0078211 A1 | 3/2011 | Gass et al. | |
| 2011/0252214 A1 | 10/2011 | Naganuma et al. | |
| 2011/0257911 A1 * | 10/2011 | Drees et al. | 702/61 |
| 2011/0283270 A1 | 11/2011 | Gass et al. | |
| 2012/0078520 A1 | 3/2012 | Kachi | |
| 2013/0067440 A1 * | 3/2013 | Tendulkar | 717/134 |
| 2013/0167131 A1 * | 6/2013 | Carson | 717/168 |
| 2013/0174140 A1 | 7/2013 | Barthel et al. | |

OTHER PUBLICATIONS

Lambert, G.N., "A Comparative Study of System Response Time on Program Developer Productivity", 1984, 8 pages.

* cited by examiner

ACCURATELY ESTIMATING INSTALL TIME

RELATED APPLICATIONS

This application is a continuation of, and claims the priority benefit of, U.S. patent application Ser. No. 13/342,567 filed on 3 Jan. 2012.

BACKGROUND

Embodiments of the inventive subject matter generally relate to the field of computers and, more particularly, to accurately estimating install time.

An enterprise environment comprises an interconnection/integration of multiple computer systems, storage devices, local and/or remote databases, and possibly multiple communication networks with different latencies/delays. The enterprise environment can comprise an interconnection between legacy systems and non-legacy systems that support different communication protocols. The enterprise environment can comprise multiple machines from different manufacturers with different configurations, hardware, platforms, operating systems, memory configurations, partitions, and performance characteristics. As a result of this variability, product installation in an enterprise environment can consume a variable and unpredictable amount of time.

SUMMARY

Various embodiments for estimating the install time are disclosed. In one embodiment, a timing parameter that influences the install time for installing a product on a plurality of sample computing machines in a test environment in accordance with an installation operation is identified. For each of the plurality of sample computing machines, a test value of the timing parameter is determined for the sample computing machine based on execution of timing parameter test operations associated with the timing parameter. For each of the plurality of sample computing machines, a test value of the install time for the sample computing machine is determined based on execution of the installation operation. A timing coefficient is determined for the timing parameter based on the test values of the timing parameter and the test values of the install time.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
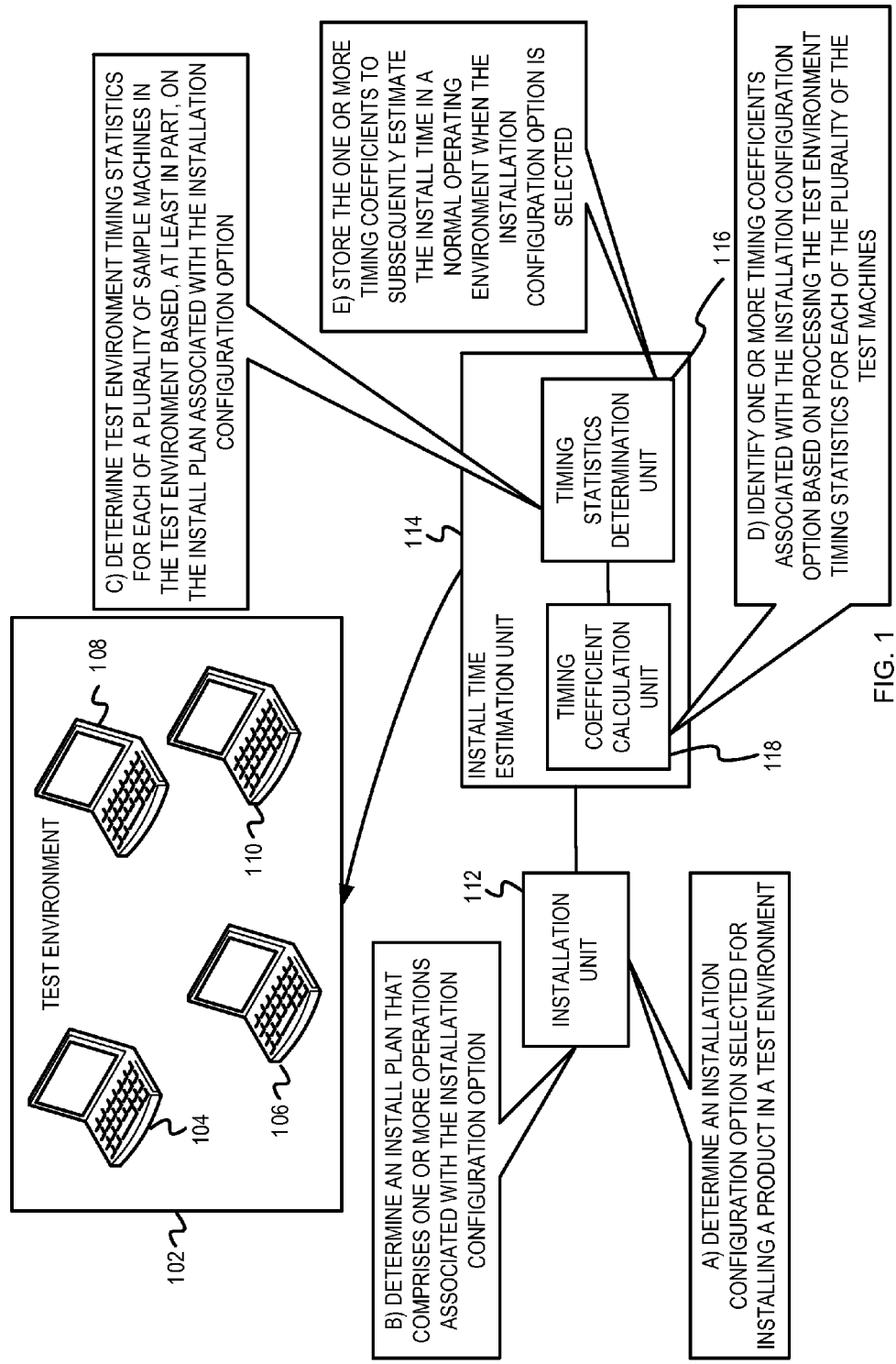
FIG. 1 is a block diagram conceptual diagram illustrating example operations for determining timing coefficients to estimate the install time.

The description that follows includes exemplary systems, methods, techniques, instruction sequences, and computer program products that embody techniques of the present inventive subject matter. However, it is understood that the described embodiments may be practiced without these specific details. For instance, although examples refer to estimating the install time for installing a product on a machine in an enterprise environment, embodiments are not so limited. In other embodiments, the operations described herein can be extended to determining the install time for installing the product across multiple machines in a distributed manner. In other instances, well-known instruction instances, protocols, structures, and techniques have not been shown in detail in order not to obfuscate the description.

Installing a product in an enterprise environment typically comprises installing multiple components/packages for use as an integrated solution. The enterprise environment can comprise machines with different hardware, software, and firmware. Although the time interval required to install the product ("install time") can be predetermined in a test environment, the test environment install time can be very different from the install time in a normal operating environment (also referred to as an actual operating environment or a non-test operating environment). This may be because of the differences in the configuration of the machines in the normal operating environment and the test environment, user interaction in the installation process, the effect of other processes executing in the normal operating environment, and other such factors (e.g., network topology, I/O performance, processor speeds, available physical memory, available storage space, current workload of the machines, network speed, type of database, etc.). Because of the scale and potential complexity of the enterprise environment, product installation in the enterprise environment can consume a variable and unpredictable amount of time. Lack of knowledge regarding how long the installation and deployment of the product in the enterprise environment will take can adversely affect support/services provided by the enterprise environment.

It would be beneficial (e.g., to administrators of the enterprise environment) if the install time in the normal operating environment (i.e., a customer's enterprise environment) could be estimated based on information collected in the normal operating environment. In a test environment, an install time estimation unit can determine one or more timing parameters that influence the install time based, at least in part, on an installation configuration option in accordance with which the product will be installed. Test environment timing parameter values can be determined for each of the timing parameters. Additionally, installation operations that are performed in accordance with the installation configuration option can be executed in the test environment to determine test environment install time values. The test environment timing parameter values and the test environment install time values can be analyzed to determine a timing coefficient for each of the timing parameters. Prior to executing the installation operations in the normal operating environment, the install time estimation unit can determine current timing parameter values for each of the timing parameters in the normal operating environment. The current timing parameter values can be combined with the previously determined timing coefficients to estimate the install time in the normal operating environment. Such a mechanism for estimating the install time based on information collected in the normal operating environment can improve the accuracy of the estimated install time. Determining a more accurate estimate of the install time can enable the administrators of the enterprise environment to schedule the installation during appropriate time intervals (e.g., during scheduled maintenance time intervals, during time intervals when the number of incoming service requests is low, etc.), to schedule other operations and tasks around the installation process, etc.

FIG. 1 is a block diagram illustrating example operations for determining timing coefficients to estimate the install time. FIG. 1 depicts a test environment 102 comprising sample machines 104, 106, 108, and 110. Depending on the network configuration of the test environment 102, the sample machines 104, 106, 108, and 110 may or may not be interconnected with each other. FIG. 1 also depicts an installation unit 112 and an install time estimation unit 114. The install time estimation unit 114 comprises a timing statistics determination unit 116 coupled with a timing coefficient calculation unit 118. The installation unit 112 can comprise functionality to execute one or more installation operations to install a product/service on the plurality of sample machines 104, 106, 108, and 110 in the test environment 102. In some implementations, the install time estimation unit 114 may be implemented as part of the installation unit 112. In other words, the installation unit 112 can be instrumented so that the installation unit 112 itself can record and collect the timing statistics (e.g., so that the installation unit 112 executes functionality of the install time estimation unit 114). In other implementations, the install time estimation unit 114 can be implemented separately from the installation unit 112. The install time estimation unit 114 in conjunction with the installation unit 112 can execute operations described below in stages A-E to determine timing coefficients in the test environment that can subsequently be used to estimate the install time in a normal operating environment.

At stage A, the installation unit 112 determines an installation configuration option selected for installing a product in the test environment 102. Installing the product typically comprises installation of one or more components (e.g., services, applications, files, etc.) of the product. A user can select (e.g., choose to install) all/some of these components of the product. The installation configuration option indicates which of the components of the product were selected by the user for installation. As will be further described below, depending on the selected installation configuration option, the installation unit 112 executes a different set of operations for installing the product.

At stage B, the installation unit 112 determines an install plan that comprises one or more operations associated with the installation configuration option. The install plan identifies the installation operations that should be executed to install the product in accordance with the installation configuration option. As described above, installing the product in accordance with the selected installation configuration option typically comprises installation of one or more components selected by the user. The install plan comprises a list of operations (e.g., data copy operations, database creation and access operations, etc.) that will be executed to install the components selected by the user. The installation unit 112 generates a different install plan for executing a different set of installation operations depending on the selected installation configuration option. For example, selecting a first installation configuration option may result in an install plan that comprises large number of database access operations, while selecting a second installation configuration option may result in an install plan that comprises only data copy operations and process start/shut down operations (and little to no database access operations).

At stage C, the timing statistics determination unit 116 determines test environment timing statistics for each of the plurality of sample machines 104, 106, 108, 110 in the test environment 102 based, at least in part, on the install plan associated with the installation configuration option. The timing statistics determination unit 116 identifies timing parameters that influence the install time associated with installing the product in accordance with the installation configuration option. For example, if the install plan indicates that only data copy operations and process shutdown operations will be executed to install the product in accordance with the selected installation configuration option, the timing statistics determination unit 116 identifies a data copy parameter and a process shutdown parameter as the timing parameters for the installation configuration option. In this example, the timing statistics determination unit 116 determines timing parameter test operations for the data copy parameter and the process shutdown parameter to determine the time consumed in executing the data copy operations and the process shutdown operations in the test environment. It is noted that depending on the selected installation configuration option and the corresponding install plan, the install time can be influenced by other suitable timing parameters (e.g., network access operations, database access operations, etc.).

In the above example, the timing statistics determination unit 116 determines to execute a predetermined number of iterations of the timing parameter test operations for the data copy parameter and the process shutdown parameter. As will be further described below in FIGS. 3-4, for each iteration, the timing statistics determination unit 116 determines a corresponding test environment timing parameter value. For example, the timing statistics determination unit 116 executes 200 iterations of the timing parameter test operations for the data copy parameter and executes 200 iterations of the timing parameter test operations for the process shutdown parameter. In this example, the timing statistics determination unit 116 determines corresponding 200 data copy time values and 200 process shutdown time values. The timing statistics determination unit 116 calculates an average of the 200 data copy time values to determine a test data copy time value for the sample machine. Likewise, the timing statistics determination unit 116 calculates an average of the 200 process shutdown time values to determine a test process shutdown time value for the sample machine. Additionally, the timing statistics determination unit 116 also executes the predetermined number of iterations of the installation operations identified by the install plan (determined at stage B). With reference to the above example, where the timing parameter test operations were executed 200 times, the timing statistics determination unit 116 executes the installation operations (e.g., install the product on the sample machines in accordance with the installation configuration option) 200 times. The timing statistics determination unit 116 determines corresponding 200 install time values and calculates an average of the 200 install time values to determine a test install time value for the sample machine.

At stage D, the timing coefficient calculation unit 118 identifies one or more timing coefficients associated with the installation configuration option based on processing the test environment timing statistics for each of the plurality of the test machines. With reference to the above example, the data copy parameter and the process shutdown parameter were determined to be the timing parameters for the selected installation configuration option. Accordingly, at stage C, the timing statistics determination unit 116 determined the test environment timing statistics comprising the test values of the timing parameters ("test timing parameter values") and the test value of the install time ("test install time value") for each of the sample machines 104, 106, 108, and 110. Subsequently, at stage D, the timing coefficient calculation unit 118 executes linear regression operations (or other suitable statistical analysis techniques or data extrapolation operations) using the test environment timing statistics to determine a timing coefficient for each of the timing parameters associated with the selected installation configuration option, as will further be described in FIGS. 3-4. For example, the timing coefficient calculation unit 118 determines the timing coefficients so that the install time can be expressed as at least a combination of the timing coefficients and the corresponding timing parameters.

At stage E, the timing coefficient calculation unit 118 stores the one or more timing coefficients to subsequently estimate the install time in a normal operating environment when the installation configuration option is selected. In some implementations, the timing coefficients can be stored as part of the installation unit 112. An indication of the corresponding timing parameters and the installation configuration option can also be stored. In some implementations, information about the test environment 102 (e.g., network configuration, and machine configuration of the sample machines 104, 106, 108, 110 etc.) based on which the timing coefficients were determined can also be stored. The installation unit 112 may also be instrumented to include a process for collecting timing statistics in the normal operating environment (referred to herein as "current timing statistics") to aid in estimating the install time in the normal operating environment. As will further be described with reference to FIG. 2 and FIG. 5, the install time for installing the product in the normal operating environment can be estimated based on the selected installation configuration option, the corresponding timing coefficients, and the current timing statistics.

It is noted as described above, that the timing parameter test operations and the installation operations are executed on the plurality of sample machines 104, 106, 108, and 110 in the test environment 102. The plurality of sample machines may implement a common operating platform but each of the plurality of sample machines can comprise a different machine configuration (e.g., different hardware, different operating system versions, etc.). For example, the plurality of the sample machines 104, 106, 108, and 110 can operate on an IBM AIX® platform but can implement different versions of the AIX platform. The machine configuration of each of the sample machines 104, 106, 108, and 110 and the number of the sample machines that implement the same machine configuration can vary. In some implementations, if the distribution, network configuration, and machine configuration of machines in the normal operating environment (e.g., a customer environment in which the product will eventually be installed) is known a priori, the test environment 102 and the sample machines 104, 106, 108, and 110 can be selected based on knowledge of the normal operating environment. In this implementation, the test environment timing statistics may be tailored to the normal operating environment, thus ensuring a more accurate install time estimate in the normal operating environment. In other implementations, however, the test environment timing statistics can be determined for various combinations in the distribution, network configuration, and machine configuration in the normal operating environment.

Figure 2:
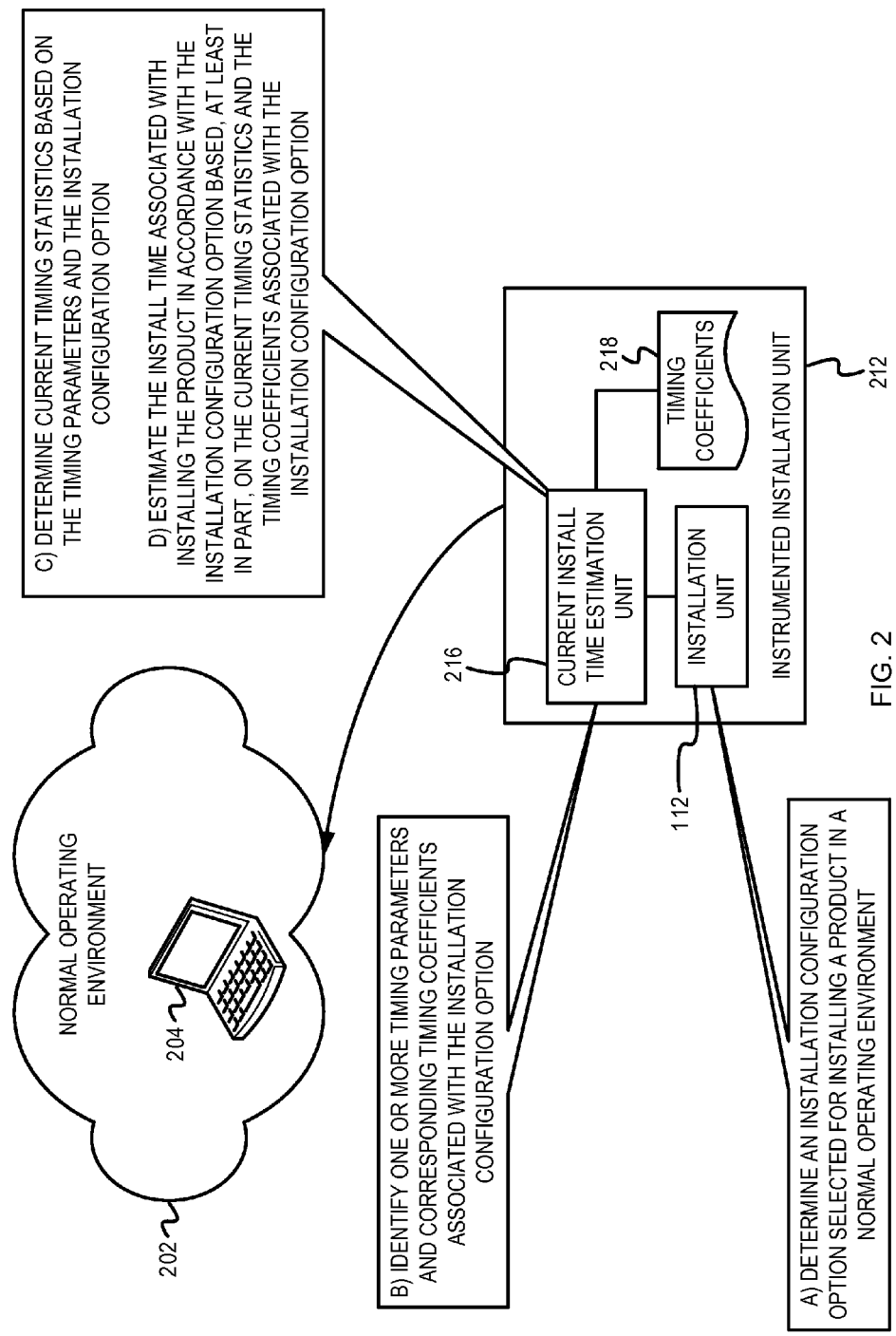
FIG. 2 is a block diagram illustrating example operations for estimating the install time in a normal operating environment based on previously calculated timing coefficients.

FIG. 2 is a block diagram illustrating example operations for estimating the install time in a normal operating environment based on previously calculated timing coefficients. FIG. 2 depicts a normal operating environment 202 comprising a computing machine 204. FIG. 2 also depicts an instrumented installation unit 212 that is executed to install a product on the computing machine 204. The instrumented installation unit 212 comprises the installation unit 112, a current install time estimation unit 216, and a timing coefficients data structure 218. The installation unit 112 executes operations to install the product in the normal operating environment. The current install time estimation unit 216 determines timing statistics in the normal operating environment 202 (referred to herein as "current timing statistics"). The current timing statistics and the timing coefficients 218 (determined in FIG. 1) may be used for estimating the install time in the normal operating environment 202. It is noted that for simplicity, the normal operating environment 202 is depicted to comprise one computing machine 204 and the operations of FIG. 2 are described accordingly. However, in other implementations, the normal operating environment 202 can comprise any suitable number of computing machines and the computing machines can be communicatively coupled with each other in any suitable configuration. Also, the operations described below in stages A-D for estimating the install time can be implemented for product installation in a distributed environment (e.g., when different components/features of the product are installed on different computing machines in the normal operating environment).

At stage A, the installation unit 112 of the instrumented installation unit 212 determines an installation configuration option selected for installing a product in the normal operating environment 202. The user selects one or more components (e.g., services, applications, files, etc.) that should be installed in the normal operating environment 202 as part of installing the product. The installation configuration option comprises an indication of the components of the product that were selected by the user for installation. After the installation configuration option is selected, the installation unit 112 determines an install plan associated with the installation configuration option. As will be described below in FIG. 5, the install plan provides a step-by-step listing of all the installation operations that will be executed for installing the product in accordance with the installation configuration option.

At stage B, the current install time estimation unit 216 identifies one or more timing parameters and corresponding timing coefficients associated with the installation configuration option. As will be further described with reference to FIG. 5, the current install time estimation unit 216 identifies one or more timing parameters based on the installation configuration option and the install plan. The current install time estimation unit 216 accesses the corresponding timing coefficients associated with the identified timing parameters and the installation configuration option from the timing coefficients data structure 218. The current install time estimation unit 216 also determines timing parameter test operations that should be executed to calculate timing statistics in the normal operating environment ("current timing statistics"). In some implementations, the timing parameter test operations that are executed in the normal operating environment 202 may be the same as those that were executed in the test environment 102 to determine the test environment timing statistics.

At stage C, the current install time estimation unit 216 determines the current timing statistics based on the timing parameters and the installation configuration option. As will be further described with reference to FIG. 5, the current install time estimation unit 216 executes a predetermined number of iterations of the timing parameter test operations on the machine(s) in the normal operating environment on which the product will be installed. The predetermined number of iterations of the timing parameter test operations can be executed to determine corresponding predetermined number of initial timing parameter values. The current install time estimation unit 216 then determines the average of the predetermined number of initial timing parameter values to determine the current timing statistics. For example, responsive to identifying a data copy parameter as the timing parameter associated with the selected installation configuration option, the current install time estimation unit 216 determines test operations for the data copy parameter and executes a predetermined number of iterations (e.g., 20 iterations) of the test operations for the data copy parameter. In this example, the current install time estimation unit 216 determines corresponding 20 data copy time values and calculates the average of the 20 data copy time values to determine a current data copy time value (which is the current timing statistics in this example).

At stage D, the current install time estimation unit 216 estimates the install time associated with installing the product in accordance with the installation configuration option based, at least in part, on the current timing statistics and the timing coefficients associated with the installation configuration option. For each of the timing parameters, the current install time estimation unit 216 calculates a product of the timing coefficient associated with the timing parameter and the current timing statistic determined for the timing parameter, as will be described with reference to FIG. 5. The current install time estimation unit 216 then adds the calculated products associated with each of the timing parameters to estimate the install time. Expressions for estimating the install time can also take other factors (e.g., error margins and factors other than the timing parameters) that can impact the install time into consideration.

It is noted that while estimating the install time in the normal operating environment based on timing coefficients determined in the test environment 102, the operation of the sample machines in the test environment 102 may be assumed to be linear with respect to the machines in the normal operating environment 202. For example, it may be determined that the data communication speed supported by an input/output (I/O) system in the test environment is 10 MBps and that the data communication speed supported by an I/O system in the normal operating environment is 5 Mbps. Because of the linearity between the test environment and the normal operating environment, it can be assumed that the time to execute a set of operations in the normal operating environment will be twice the time to execute the same set of operations in the test environment. If only the I/O operations are taken into consideration while estimating the install time, the install time in the normal operating environment may be twice the install time in the test environment. As another example, executing a set of database operations (e.g., connecting to a database, executing database queries such as SQL queries, disconnecting from the database, etc.) in a test environment may consume a first database access time interval (e.g., 5 seconds). Executing the same set of database operations in the normal operating environment may consume a second database access time interval (e.g., 15 seconds). Because of the linearity between the test environment and the normal operating environment, it can be assumed that the database in the normal operating environment is three times slower than the database in the test environment. Accordingly, it may be determined that database-related operations in the normal operating environment will consume thrice the amount of time as compared to the test environment.

Figure 3:
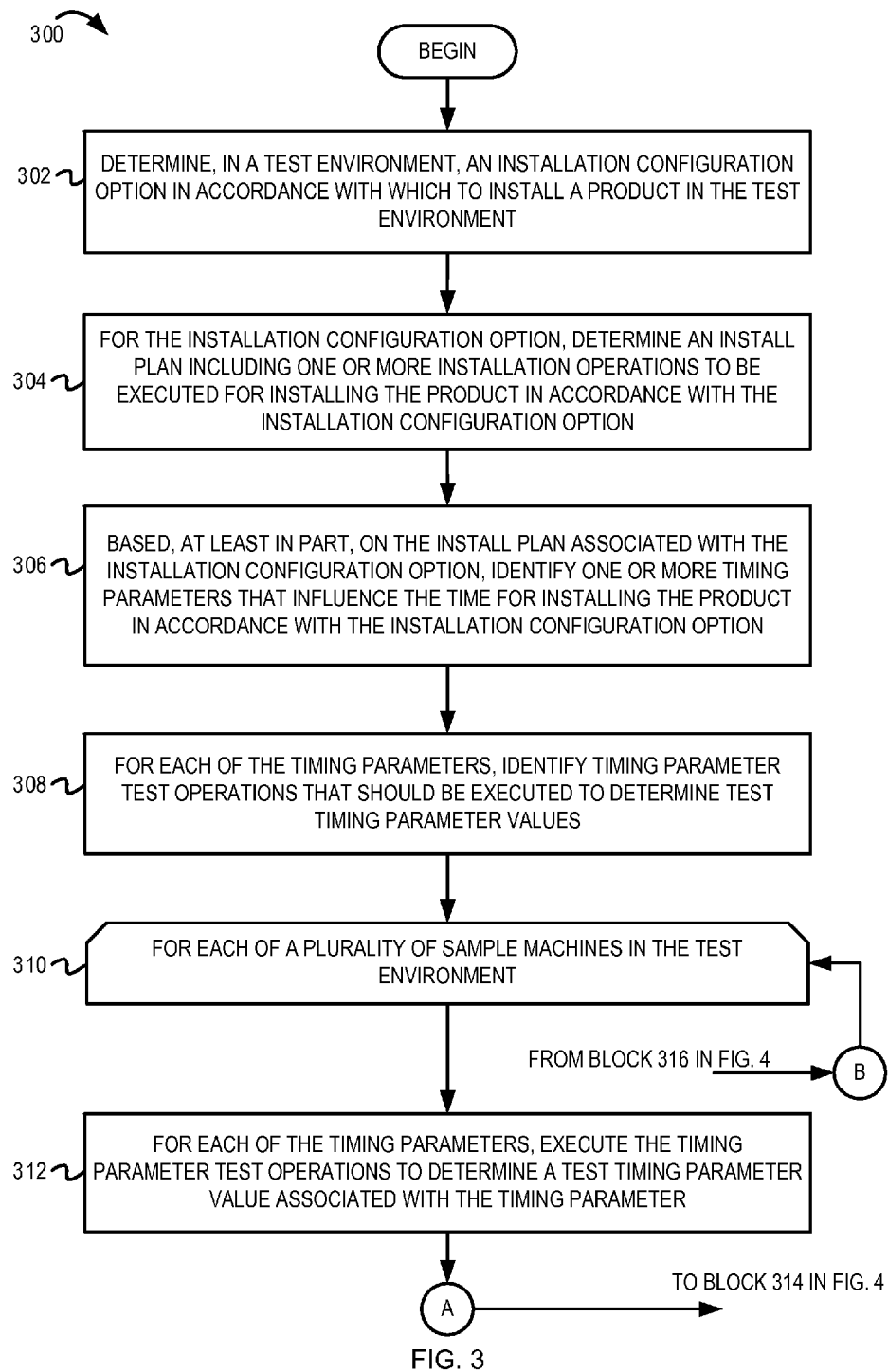
FIG. 3 is a flow diagram illustrating example operations for determining timing coefficients to estimate the install time.
Figure 4:
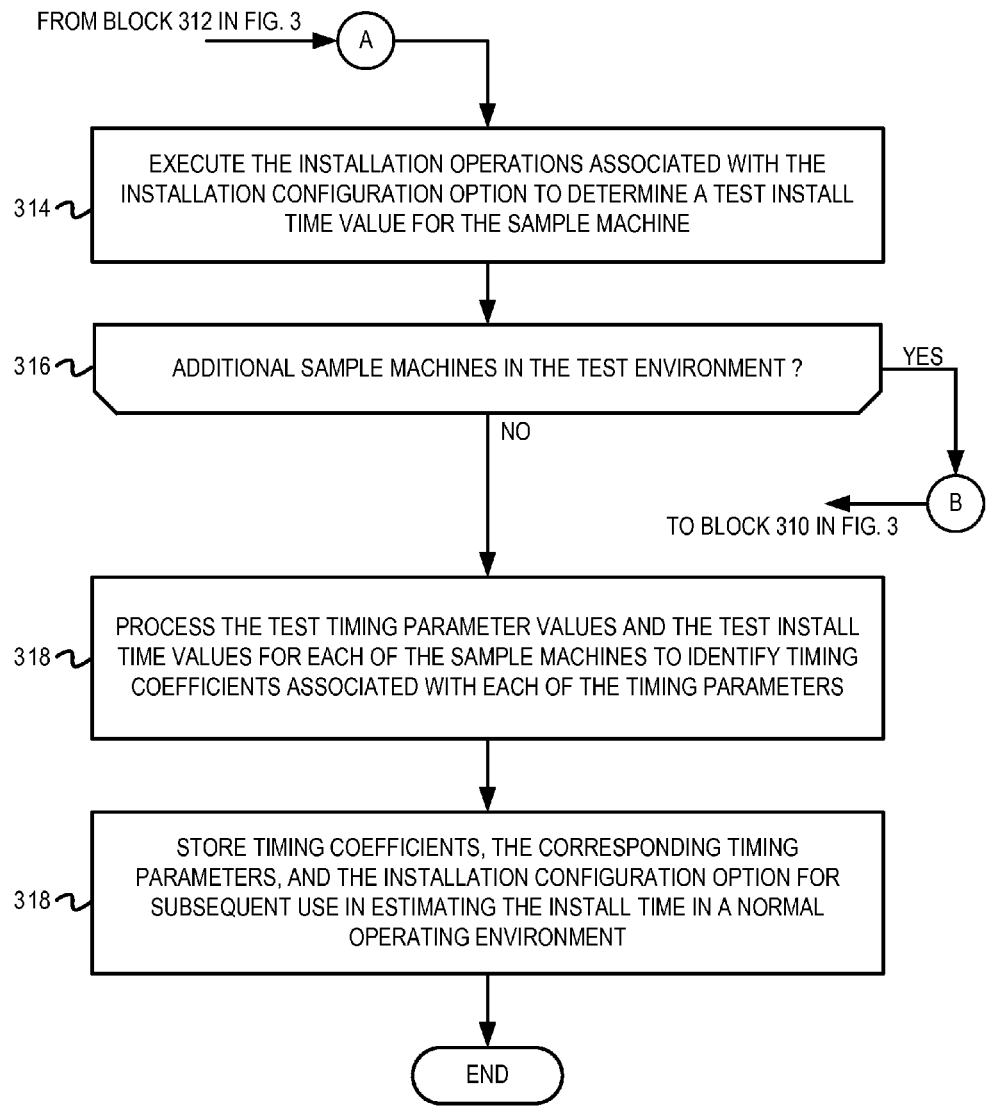
FIG. 4 is a continuation of FIG. 3 and also illustrates example operations for determining timing coefficients to estimate the install time.

FIG. 3 and FIG. 4 depict a flow diagram illustrating example operations for determining timing coefficients to estimate the install time. Flow 300 begins at block 302 in FIG. 3.

An installation configuration option in accordance with which to install a product in a test environment is determined (block 302). As described above with reference to FIG. 1, the installation configuration option indicates which components (e.g., services, applications, files, etc. of the product to be installed) should be installed. An installation configuration selection screen may be presented to a user (e.g., a network administrator). In some implementations, the installation configuration selection screen may present a list of components of the product and may prompt the user to select one or more components that should be installed as part of installing the product. The installation configuration option indicates which of the components of the product were selected by the user for installation. The flow continues at block 304.

An install plan including one or more installation operations to be executed for installing the product in accordance with the installation configuration option is determined (block 304). The install plan provides a step-by-step listing of all the installation operations that will be executed to install the product in accordance with the installation configuration option determined at block 302. For example, the install plan may indicate that a first set of data should be copied from an installation disk onto a local storage device, that a new database comprising one or more tables should be created, that a second set of data should be stored in the database, etc. The install plan indicates a chronological listing of data/file copy operations, database operations, network access operations, process start-up or shutdown operations, and other suitable operations that will be executed for installing the product in accordance with the installation configuration option. Installing different components of the product typically involves executing different installation operations. Therefore, the install plan can vary (i.e., comprise a different set of installation operations) depending on the selected installation configuration option. For example, the install plan associated with a first installation configuration option may comprise a large number of database access operations, the install plan associated with a second installation configuration option may not comprise any database access operations, while the install plan associated with a third installation configuration option may only comprise data copy operations. The flow continues at block 306.

One or more timing parameters that influence the time for installing the product in accordance with the installation configuration option are identified based, at least in part, on the install plan associated with the installation configuration option (block 306). The install plan can comprise data copy operations (e.g., file movement operations), I/O operations, database operations (e.g., database access, database modification, database creation, etc.), process shutdown operations, etc. Accordingly, the timing parameters can include a data copy parameter, database-related timing parameters (e.g., a database access parameter, a database modification parameter, a database creation parameter, etc.), a process shutdown parameter, and other suitable timing parameters. A good estimate of the time that will be required for installing a product in the normal operating environment can be determined by identifying the timing parameters (or at least a subset of the important timing parameters) that influence the install time. This can enable prediction of the install time irrespective of the complexity of the installation process.

The install plan associated with the installation configuration option typically comprises a variety of installation operations. Some of the installation operations consume a minimal amount of time (e.g., a UNIX® ls command that lists the contents of a directory) while other installation operations (e.g., operations associated with IBM WebSphere® applications) consume a longer time. Depending on the desired accuracy of the install time estimate, some or all of the installation operations of the install plan can be used to identify the timing parameters and to determine the timing parameters for subsequent estimation of the install time in the normal operating environment. In one implementation, all of the installation operations of the install plan are taken into consideration to determine the timing parameters associated with the selected installation configuration option. For example, if the install plan contains a set of data copy operations and process shutdown operations, a data copy parameter and a process shutdown parameter are selected as the timing parameters associated with the selected installation configuration option. In another implementation, the installation operations that consume the longest durations (e.g., the set of operations that consume a predetermined percentage (e.g., 80%) of the total time) are taken into consideration to determine the timing parameters associated with the selected installation configuration option. In one example, the install plan comprises a set of data copy operations, database-related operations, and process shutdown operations. If it is determined that the database-related operations consume the most amount of time, only a database manipulation parameter is selected as the timing parameter associated with the selected installation configuration option. In some implementations, each set of operations can comprise corresponding constituent sub-operations. For example, the database-related operations can comprise operations for creating a database, establishing a connection to the database, storing data entries in the database, executing database queries, and terminating the connection with the database. In some implementations, all of the sub-operations are taken into consideration (e.g., as part of the timing parameter test operations described below) to determine the test timing parameter values described below. Alternatively, the database manipulation parameter may be divided into a database connection sub-parameter, a database query sub-parameter, a database termination sub-parameter, etc. However, some of the sub-operations may take longer to execute than others. In this example, it may be determined that the operations for creating the database consume a majority (80% in one example) of the time. Accordingly only the database creation sub-operations can be taken into consideration (e.g., as part of the timing parameter test operations described below) to determine the test environment timing parameter values described below. In other words, the database access parameter may only comprise a database connection sub-parameter. The flow continues at block 308.

For each of the timing parameters, timing parameter test operations that should be executed to determine test timing parameter values are identified (block 308). The timing parameter test operations comprise a set of one or more operations that should be executed to determine how long it takes to execute test operations for the timing parameter on a sample machine in the test environment (described below). In one example, the data copy parameter and the process shutdown parameter are selected as the timing parameters associated with the installation configuration option. Accordingly, the timing parameter test operations for the data copy parameter and the process shutdown parameter are determined (e.g., based on accessing a data structure or a suitable memory location, based on information hardcoded into an install time estimation unit, etc.). For example, the timing parameter test operations for the data copy parameter comprise copying a file (e.g., a section of memory) from one location to another location. As another example, the timing parameter test operations for the data copy parameter comprise copying a file from one storage device to another storage device. As another example, the timing parameter test operations for the process shutdown parameter comprise starting and terminating one or more predetermined processes. As another example, the timing parameter test operations for a database manipulation parameter comprise establishing a connection with the database, creating a database table, executing one or more database queries, and terminating the connection with the database. It is noted that in other implementations, other suitable timing parameter test operations can be executed. The flow continues at block 310.

A loop begins for each of a plurality of sample machines in the test environment (block 310). In some implementations, if knowledge of the normal operating environment (e.g., a customer environment in which the product will eventually be installed) is available a priori, the sample machines in the test environment are selected to approximately match the configuration of machines in the normal operating environment. In other implementations, however, the sample machines in the test environment are selected in accordance with any suitable sample machine configuration. In some implementations, a predetermined number of sample machines (e.g., 50 machines) can be selected per computing platform (or operating system). However, subsets of the sample machines may be configured to implement different versions of the computing platform. For example, for a Microsoft® Windows® operating system, a first subset of the sample machines may be configured to implement a Windows 2000 operating system, a second subset of sample machines may be configured to implement a Windows 7 operating system, and so on. In some implementations, the number of sample machines that constitute each of the subsets are based on knowledge of the configuration of machines in the normal operating environment. In other implementations, each of the subsets can comprise any suitable number of sample machines. The operations described below in blocks 312-314 are then executed on each of the sample machines to determine the test environment timing statistics. The flow continues at block 312.

For each of the timing parameters, the timing parameter test operations associated with the timing parameter are executed to determine a test timing parameter value associated with the timing parameter (block 312). A predetermined number of iterations of the timing parameter test operations are executed on the sample machine to determine corresponding predetermined number of initial timing parameter values. An average of the predetermined number of initial timing parameter values is calculated to determine the test timing parameter value associated with the timing parameter and the sample machine. In one example as described above with reference to block 308, the timing parameter test operations associated with the data copy parameter comprises copying a file from one location to another location. The timing parameter test operations are executed a predetermined number of times (e.g., 100 times) to determine corresponding predetermined number of data copy time values. In this example, the file is copied from one location to another location 100 times to determine corresponding 100 data copy time values. An average of the 100 data copy time values is calculated to determine a test data copy time value ($T_{copy}$) for the sample machine. Likewise, the timing parameter test operations associated with the process shutdown parameter may comprise starting and terminating a predetermined process. The timing parameter test operations are executed the predetermined number of times (e.g., the predetermined process is started and terminated 100 times) to determine corresponding 100 process shutdown time values. An average of the 100 process shutdown time values is calculated to determine a test process shutdown time value ($T_{shutdown}$) for the sample machine. It is noted that in other implementations, test operations for other suitable timing parameters may be executed to determine the corresponding test timing parameter value. For example, as described above, the timing parameter test operations associated with the database manipulation parameter may comprise establishing a connection with the database, executing one or more database queries, and closing the connection with the database. This set of timing parameter test operations for the database manipulation parameter may be executed 100 times to determine corresponding 100 database manipulation time values. An average of the 100 database manipulation time values can be calculated to determine a test database manipulation time value for the sample machine. It is noted that the database manipulation time interval can depend on whether the database is remote or local, the communication network topology, the traffic on the communication network, etc. The flow continues at block 314 in FIG. 4.

The one or more installation operations associated with the installation configuration option are executed to determine a test install time value for the sample machine (block 314). The predetermined number of iterations of the installation operations are executed on the sample machine to determine corresponding predetermined number of initial install time values. An average of the predetermined number of initial install time values is calculated to determine the test install time value associated with the sample machine. As described above with reference to the example of block 312, the timing parameter test operations associated with the data copy parameter and the process shutdown parameter were each executed 100 times to determine 100 data copy time values and 100 process shutdown time values respectively. Likewise, at block 314, the installation operations (determined at block 304) associated with the installation configuration option are executed 100 times on the sample machine to determine corresponding 100 install time values for the sample machine. An average of the 100 install time values is calculated to determine a test install time value ($T_{install}$) for the sample machine. The flow continues at block 316.

It is determined whether additional sample machines in the test environment are to be analyzed (block 316). If it is determined that additional sample machines in the test environment are to be analyzed, the flow continues at block 310 in FIG. 3, where the next sample machine is identified and operations described above in blocks 312 and 314 are executed for the next sample machine. Otherwise, the flow continues at block 318.

The test timing parameter values and the test install time values for each of the sample machines are processed to identify timing coefficients for each of the timing parameters (block 318). For convenience, the test timing parameter values for each of the sample machines and the test install time values for each of the sample machines are together referred to as the test environment timing statistics. Suitable data extrapolation operations (or statistical analysis) are executed on the test environment timing statistics to identify the timing coefficients associated with the timing parameters, as depicted in Exp. 1. For example, statistical analysis is performed using the test install time values and the test timing parameter values to determine the relationship between the install time and the timing parameters. When linear regression techniques are employed, the relationship between the install time and the timing parameters is expressed by the equation of a straight line. In one example, linear regression operations can be executed based on the test install time values ($T_{install}$) for each of the sample machines, the test data copy time values ($T_{copy}$) for each of the sample machines, and the process shutdown time values ($T_{shutdown}$) for each of the sample machines, as depicted in Exp. 1 to determine the relationship between the install time, the data copy time, and the process shutdown time.

$$T_{install} = \text{Constant} + (K_{copy} * T_{copy}) + (K_{shutdown} * T_{shutdown}) \qquad \text{Exp. 1}$$

In Exp. 1, $K_{copy}$ and $K_{shutdown}$ are the timing coefficients (or regression coefficients) associated with the data copy parameter and the process shutdown parameter respectively for the selected installation configuration option. The constant is also referred to as an error term and can capture the other factors (e.g., other than the data copy parameter and the process shutdown parameter) that influence the install time. In some implementations, the constant can also account for measurement errors. The timing coefficients and the constant are calculated by combining the test install time values and the test timing parameter values, both of which were determined for each of the plurality of sample machines. For example, in accordance with linear regression operations, the constant can be calculated by summing the test timing parameter values determined for the sample machines, multiplying this sum with the timing coefficient associated with the timing parameter, subtracting the result from the sum of the test install time values, and dividing the result by the number of sample machines in the test environment. The timing parameters, the corresponding timing coefficients, and the constant together form an "install time estimation expression" that is used to estimate the install time in a normal operating environment. It is noted that in other implementations, other suitable data extrapolation techniques, line fitting techniques, curve-fitting techniques, or data analysis techniques can be employed to determining the timing coefficients and the install time estimation expression. It is also noted that although Exp. 1 depicts an install time estimation expression with the data copy parameter and the process shutdown parameter, embodiments are not so limited. In other embodiments, the install time estimation expression can comprise any suitable number and type of timing parameters. The flow continues at bock 320.

The timing coefficients, the corresponding timing parameters, and the installation configuration option are stored for subsequent use in estimating the install time in a normal operating environment (block 320). In some implementations, the timing coefficients, the corresponding timing parameters, and the installation configuration option can be stored as part of an installation unit that will be executed to install the product in the normal operating environment. Additionally, the platform (e.g., AIX, Windows, etc.) for which the install time estimation expression was determined can also be stored as part of the installation unit. As will be further described in FIG. 5, when the installation configuration option is selected, an appropriate install time estimation expression can be selected, and current timing statistics can be determined in the normal operating environment. The current timing statistics can be used in the selected install time estimation expression to estimate the install time in the normal operating environment. From block 320, the flow ends.

Figure 5:
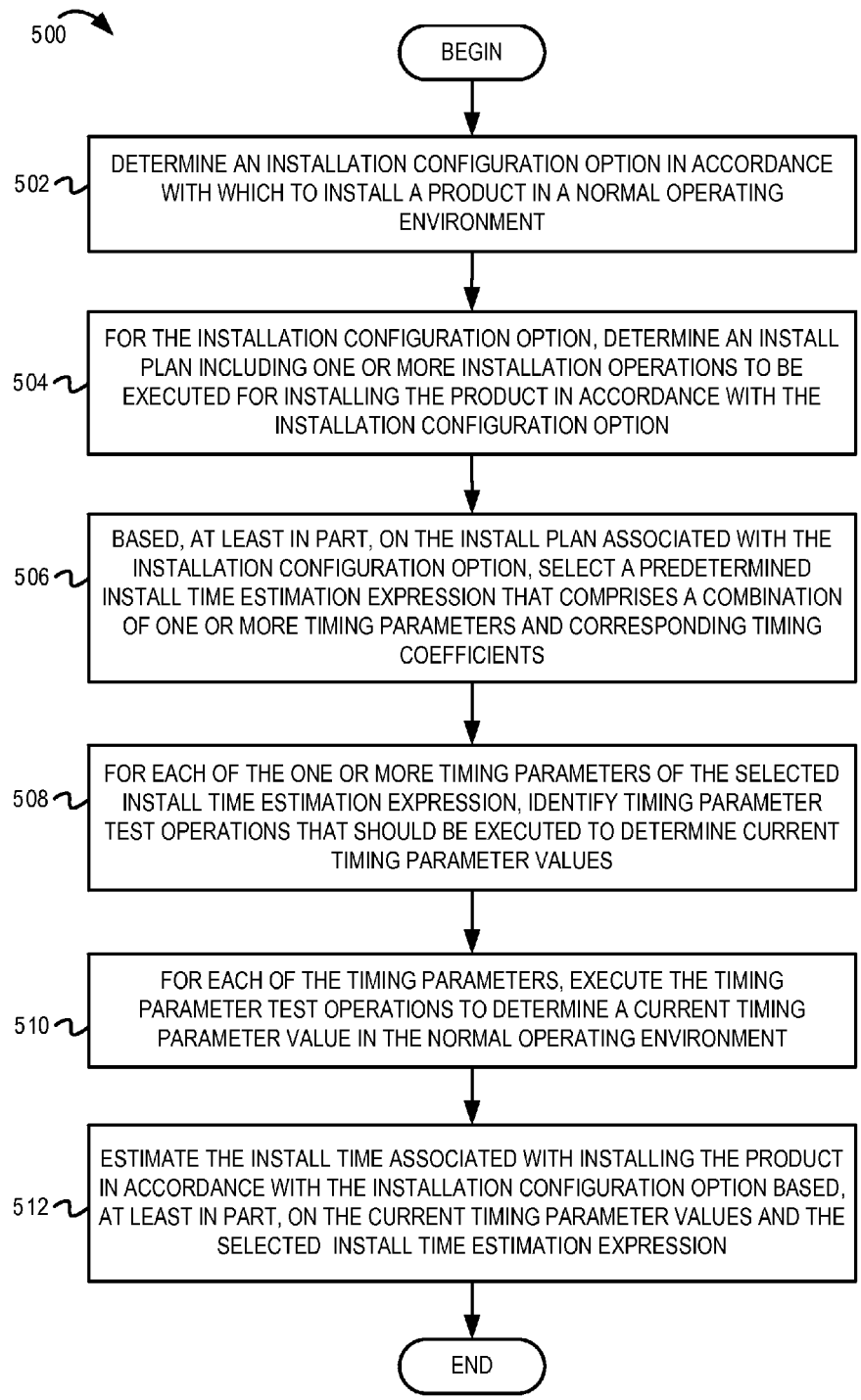
FIG. 5 is a flow diagram illustrating example operations for estimating the install time using previously calculated timing coefficients.

FIG. 5 is a flow diagram illustrating example operations for estimating the install time in a normal operating environment using previously calculated timing coefficients. Flow 500 begins at block 502.

An installation configuration option in accordance with which to install a product in a normal operating environment is determined (block 502). As described above with reference to FIG. 3, an installation configuration selection screen is presented to a user (e.g., an enterprise network administrator) of the normal operating environment (e.g., a business enterprise environment). The user selects one or more components (e.g., services, applications, files, etc.) that should be installed in the normal operating environment as part of installing the product. The installation configuration option comprises an indication of the components of the product were selected by the user for installation. The flow continues at block 504.

An install plan including one or more installation operations to be executed for installing the product in accordance with the installation configuration option is determined (block 504). As described above with reference to FIG. 3, the install plan provides a step-by-step listing of all the installation operations that will be executed to install the product in accordance with the installation configuration option. Installing different components of the product typically involves executing different installation operations. Therefore, the install plan varies (i.e., comprise a different set of installation operations) depending on the selected installation configuration option. The flow continues at block 506.

A predetermined install time estimation expression that comprises a combination of one or more timing parameters and corresponding timing coefficients is selected based, at least in part, on the install plan associated with the installation configuration option (block 506). As described above, the install plan associated with the selected installation configuration option indicates the installation operations that will be executed for installing the product in accordance with the installation configuration option. The install plan is analyzed to determine one or more timing parameters associated with the installation configuration option. For example, the install plan may indicate that data copy operations, process termination operations, and database manipulation operations will be performed to install the product in accordance with the installation configuration option. Accordingly, a data copy parameter, a process shutdown parameter, and a database manipulation parameter may be selected as the timing parameters associated with the installation configuration option. In some implementations, the user may indicate the accuracy with which the install time should be estimated. For example, to determine a very accurate estimate of the install time, all the timing parameters associated with the installation configuration option may be taken into consideration while estimating the install time. As another example, to determine an approximate estimate of the install time, only a subset of the timing parameters associated with the installation configuration option may be taken into consideration while estimating the install time. In this example, it may be determined that the database manipulation operations constitute a majority of the installation operations (or consume a majority of the install time). Accordingly, only the database manipulation parameter may be used to estimate the install time.

Based on knowledge of the installation configuration option and the corresponding timing parameters, an appropriate install time estimation expression is selected. In some implementations, the selected installation configuration option is associated with multiple install time estimation expressions. The appropriate install time estimation expression is selected based on the timing parameters that will be used to estimate the install time. For example, the selected installation configuration option can be associated with two install time estimation expressions—a first expression that uses the data copy parameter, the process shutdown parameter, and the database manipulation parameter and a second expression that uses only the database manipulation parameter. If it determined that an approximate estimate of the install time should be determined and only the database manipulation parameter should be used, the second install time estimation expression can be selected. The flow continues at block 508.

For each of the one or more timing parameters of the selected install time estimation expression, timing parameter test operations that should be executed to determine current timing parameter values are identified (block 508). As described above with reference to block 308 in FIG. 3, the timing parameter test operations comprise a set of one or more operations that should be executed to determine how long it takes to execute test operations for the timing parameter ("current timing parameter values") in the normal operating environment. In some implementations, the timing parameter test operations that are executed in the normal operating environment may be the same as those that were executed in the test environment to determine the install time estimation expressions. In some implementations, the timing parameter test operations may be provided as part of the installation unit (e.g., hardcoded or stored at a predetermined memory location). As described above, in one example, the timing parameter test operations for the data copy parameter comprise copying a predetermined amount of data (e.g., a 5 GB file) from one location to another location or from one storage device to another storage device. As another example, the timing parameter test operations for the database manipulation parameter comprise creating a database, connecting to the database, executing one or more data storage operations and data access operations, and disconnecting from the database. As another example, the timing parameter test operations for the process shutdown parameter comprise starting and terminating one or more predetermined processes. In some implementations, the processes that are started and terminated as part of the timing parameter test operations for the process shutdown parameter may be processes that are known to exist on machines in the normal operating environment. In some implementations, the installation unit comprises a list (e.g., hardcoded as part of the installation unit or stored in a predetermined memory location) of one or more processes that are likely present on machines in the normal operating environment. For example, for a Windows operating system, these processes can comprise a Windows Telnet process, a Windows log on process, an Internet log on service, etc. To execute the timing parameter test operations for the process shutdown parameter, one or more of the processes can be selected (e.g., randomly, based on the priority of the listed processes, based on the availability of the listed processes on the machines in the normal operating environment, and/or based on other suitable criteria). The selected processes are then started and terminated in accordance with the timing parameter test operations to determine the process shutdown time in the normal operating environment ("current process shutdown time value"). The flow continues at block 510.

For each of the timing parameters, the timing parameter test operations associated with the timing parameter are executed to determine a current timing parameter value associated with the timing parameter (block 510). As described above with reference to block 312 of FIG. 3, a predetermined number of iterations of the timing parameter test operations are executed on the machine(s) in the normal operating environment on which the product will be installed. The predetermined number of iterations of the timing parameter test operations may be executed to determine corresponding predetermined number of initial timing parameter values. An average of the predetermined number of initial timing parameter values is calculated to determine the amount of time consumed in executing the same processes (i.e., the timing parameter test operations) in the normal operating environment. Typically, the installation unit can comprise a background process (or thread) that determines the current timing parameter values. It is noted that the timing parameter test operations may be executed a fewer number of times in the normal operating environment as compared to the test environment. For example, if the timing parameter test operations were executed 100 times in the test environment to determine the test timing parameter values, the timing parameter test operations may be executed 20 times in the normal operating environment to determine the current timing parameter values. As described above with reference to block 312 in FIG. 3, the timing parameter test operations for the data copy parameter is executed a predetermined number of times (e.g., 20 times) to determine a corresponding predetermined number of data copy time values (e.g., 20 data copy time values). An average of the 20 data copy time values is calculated to determine a current data copy time value ($T_{current\_copy}$) in the normal operating environment. Likewise, a current process shutdown time value ($T_{current\_shutdown}$) and other suitable current timing parameter values (e.g., a current database manipulation time value) are also determined in the normal operating environment. The flow continues at block 512.

The install time in the normal operating environment is estimated based, at least in part, on the current timing parameter values and the selected install time estimation expression (block 512). For example, suppose that the install time estimation expression selected at block 506 was the expression depicted by Exp. 1. As described above, the timing coefficients $K_{copy}$ and $K_{shutdown}$ and the constant are known quantities in the install time estimation expression. In this example, the appropriate current timing parameter values (determined at block 510) are the current data copy time value $T_{current\_copy}$ and the current process shutdown time value $T_{current\_shutdown}$. These current timing parameter values are inserted into the install time estimation expression as depicted by Exp. 2. The right side of Exp. 2 is solved to estimate the install time for installing the product in accordance with the installation configuration option in the normal operating environment. From block 512, the flow ends.

$$T_{current\_install} = \text{Constant} + (K_{copy} * T_{current\_copy}) + (K_{shutdown} * T_{current\_shutdown}) \quad \text{Exp. 2}$$

It should be understood that FIGS. 1-5 are examples meant to aid in understanding embodiments and should not be used to limit embodiments or limit scope of the claims. Embodiments may perform additional operations, fewer operations, operations in a different order, operations in parallel, and some operations differently. In some implementations, after the install time estimate in the normal operating environment is presented (e.g., on a display unit to a network administrator), the network administrator can determine whether to terminate (or initiate) the execution of one or more processes in the normal operating environment. For example, if the estimate of the install time is high, the network administrator may identify one or more processes that can be terminated and may terminate the identified processes to potentially reduce the install time. The network administrator can then provide an input (e.g., by clicking on a "start install" link) to initiate installation of the product in the normal operating environment in accordance with the installation configuration option.

Although examples describe data copy operations and process shutdown operations being taken into consideration to determine the install time estimation expression (see Exp. 1) and to estimate the install time in the normal operating environment (see Exp. 2), embodiments are not so limited. In other embodiments, other suitable operations of the install plan associated with the installation configuration option are taken into consideration to determine the install time estimation expression and to estimate the install time in the normal operating environment. For example, network round trips, database round trips, WebSphere round trips, whether the installing will be performed in a distributed environment, security and firewall issues, and other such factors may also be taken into consideration.

In some implementations, the functionality for generating the install time estimation expressions (described in FIGS. 3 and 4) and the functionality for using the install time estimation expressions to estimate the install time (described in FIG. 5) can be combined into a standalone install time estimation utility. The standalone install time estimation utility can be executed in the normal operating environment to improve the accuracy of the install time estimate. In other words, instead of executing the operations of FIGS. 3-4 in the test environment and determining the install time estimation expressions based on timing statistics collected in the test environment, the operations of FIGS. 3-4 may be executed in the normal operating environment (e.g., in a customer's enterprise environment) and the install time estimation expressions can be determined based on timing statistics obtained in the normal operating environment. The install time estimation expressions that are tailored to the normal operating environment can be determined for various installation configurations and can then be stored. In response to determining to install the product in the normal operating environment, the operations of FIG. 5 can be executed to select the appropriate install time estimation expression and to estimate the install time.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
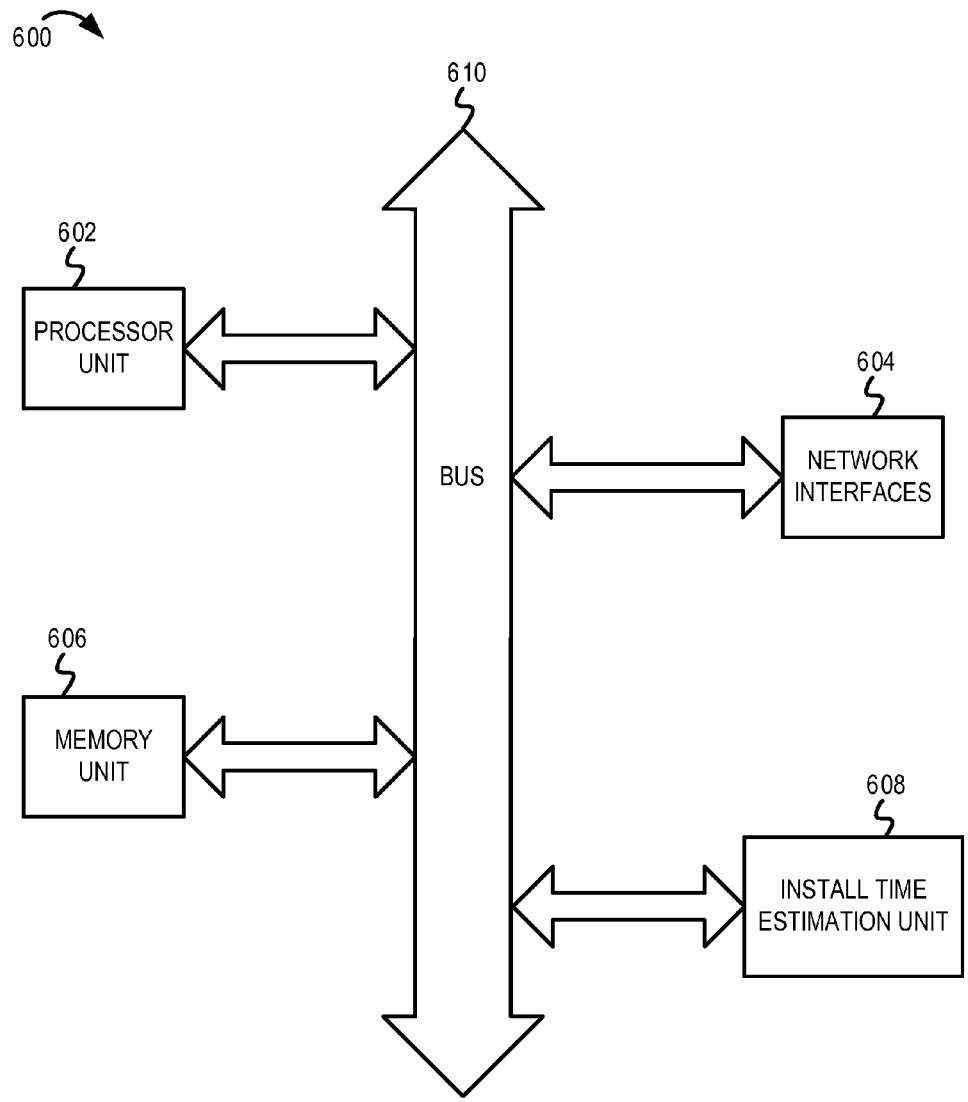
FIG. 6 is a block diagram of one embodiment of an electronic system including a mechanism for estimating the install time.

FIG. 6 is a block diagram of one embodiment of an electronic system 600 including a mechanism for estimating the install time. The electronic system 600 includes a processor unit 602 (possibly including multiple processors, multiple cores, multiple nodes, and/or implementing multi-threading, etc.). The electronic system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer readable storage media. The electronic system 600 also includes a bus 610 (e.g., PCI, ISA, PCI-Express, HyperTransport®, InfiniBand®, NuBus, AHB, AXI, etc.), and a network interface 604 that includes at least one of a wireless network interface (e.g., a WLAN interface, a Bluetooth® interface, a WiMAX interface, a ZigBee® interface, a Wireless USB interface, etc.) and a wired network interface (e.g., an Ethernet interface, an ATM interface, a Frame Relay interface, SONET interface, etc.). The processor unit 602, the memory unit 606, and the network interface 604 are coupled to the bus 610.

The electronic system 600 also includes an install time estimation unit 608. The install time estimation unit 608 can implement functionality to determine one or more timing parameters that influence the install time associated with installing a product in accordance with a selected installation configuration option. The install time estimation unit 608 can determine test timing statistics and can use the test timing statistics to determine an install time estimation expression associated with the installation configuration option, as described above in FIGS. 1, 3, and 4. In a normal operating environment, the install time estimation unit 608 can determine (e.g., responsive to user input) to install the product in accordance with the installation configuration option. Accordingly, the install time estimation unit 608 can identify an appropriate install time estimation expression and can determine current timing statistics in the normal operating environment. The install time estimation unit 608 can use the install time estimation expression and the current timing statistics to estimate the install time in the normal operating environment, as described above in FIGS. 2 and 5.

Although FIG. 6 depicts the install time estimation unit 608 being implemented as part of the electronic system 600, it is noted that in other implementations, the install time estimation unit 608 can be embodied on a distinct circuit board (or integrated circuit) and may be externally coupled with the processor unit 602 and/or the electronic system 600. For example, the install time estimation unit 608 can be implemented as part of an installation unit that comprises and executes operations for installing the product. In some implementations, the electronic system 600 may be a circuit board, a system on a chip, an interconnection of one or more integrated circuits, or other suitable electronic systems. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, techniques for estimating install time as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for estimating install time, the computer program product comprising:
    a computer readable storage medium having computer usable program code embodied therewith, the computer usable program code to:
        identify a timing parameter that influences the install time for installing a product on a plurality of sample computing machines in a test environment in accordance with an installation operation;
        for each of the plurality of sample computing machines,
            determine a test value of the timing parameter for the sample computing machine based on execution of timing parameter test operations associated with the timing parameter;
            determine a test value of the install time for the sample computing machine based on execution of the installation operation; and
        determine a timing coefficient for the timing parameter based on the test values of the timing parameter and the test values of the install time.

2. The computer program product of claim 1, wherein the computer usable program code to determine the test value of the install time for each of the plurality of sample computing machines comprises computer usable program code to:
    for each of the plurality of sample computing machines,
        for a predetermined number of iterations, determine an initial test environment install time value based on execution of the installation operation on the sample computing machine; and
        calculate an average of the initial test environment install time values to determine the test value of the install time for the sample computing machine.

3. The computer program product of claim 1, wherein the computer usable program code to determine a test value of the timing parameter for each of the plurality of sample computing machines comprises computer usable program code to:
    for each of the plurality of sample computing machines,
        for a predetermined number of iterations, determine an initial test environment timing parameter value based on execution of the timing parameter test operations on the sample computing machine; and
        calculate an average of the initial test environment timing parameter values to determine the test value of the timing parameter for the sample computing machine.

4. The computer program product of claim 1, further comprising computer usable program code to:
    record the timing coefficient and the installation operation, wherein the install time for installing the product in accordance with the installation operation in a non-test operating environment is estimated based on the timing coefficient.

5. The computer program product of claim 1, further comprising computer usable program code to:
    generate an install time calculation expression for estimating the install time associated with installing the product in accordance with the installation operation, wherein the install time calculation expression comprises at least a combination of the timing parameter and the timing coefficient associated with the timing parameter; and
    store the install time calculation expression as part of an installation unit, wherein the installation unit is executed for installing the product in a non-test operating environment.

6. The computer program product of claim 1, further comprising computer usable program code to:
    responsive to determining to install the product in a non-test operating environment in accordance with the installation operation, select a first of a plurality of predetermined install time calculation expressions that comprises at least a combination of the timing parameter and the corresponding timing coefficient based, at least in part, on the installation operation in accordance with which to install the product in the non-test operating environment;
    determine a current value of the timing parameter based on execution of the timing parameter test operations in the non-test operating environment; and
    estimate the install time associated with installing the product in accordance with the installation operation in the non-test operating environment based on the current value of the timing parameter, the timing coefficient, and the first of the plurality of install time calculation expressions.

7. The computer program product of claim 6, wherein the computer usable program code to select the first of the plurality of predetermined install time calculation expressions comprises computer usable program code to:
    select the first of the plurality of predetermined install time calculation expressions based on the installation operation and a user selected accuracy level associated with estimating the install time.

8. The computer program product of claim 6, wherein the computer usable program code to determine the current value of the timing parameter comprises computer usable program code to:
    for a predetermined number of iterations,
        determine an initial timing parameter value based on execution of the timing parameter test operations in the non-test operating environment; and
    calculate an average of the initial timing parameter values to determine the current value of the timing parameter in the non-test operating environment.

9. The computer program product of claim 1,
    wherein the timing parameter comprises at least one of a data copy parameter, a process shutdown parameter, a database parameter, a network round-trip parameter, and a hard disk access parameter, and
    wherein the test value of the timing parameter comprise at least one of a data copy time interval, a process shutdown time interval, a database time interval, a network round-trip time interval, and a hard disk access time interval.

10. The computer program product of claim 1,
    wherein installing the product comprises installing a plurality of components of the product, and wherein the installation operation indicates at least a subset of the components of the product selected for installation.

11. A method comprising:
identifying a timing parameter that influences an install time for installing a product on a plurality of sample computing machines in a test environment in accordance with an installation operation;
for each of the plurality of sample computing machines,
determining a test value of the timing parameter for the sample computing machine based on execution of timing parameter test operations associated with the timing parameter;
determining a test value of the install time for the sample computing machine based on execution of the installation operation; and
determining a timing coefficient for the timing parameter based on the test values of the timing parameter and the test values of the install time.

12. The method of claim 11, wherein said determining the test value of the install time for each of the plurality of sample computing machines comprises:
for each of the plurality of sample computing machines,
for a predetermined number of iterations, determining an initial test environment install time value based on execution of the installation operation on the sample computing machine; and
calculating an average of the initial test environment install time values to determine the test value of the install time for the sample computing machine.

13. The method of claim 11, further comprising:
recoding the timing coefficient and the installation operation, wherein the install time for installing the product in accordance with the installation operation in a non-test operating environment is estimated based on the timing coefficient.

14. The method of claim 11, further comprising:
generating an install time calculation expression for estimating the install time associated with installing the product in accordance with the installation operation, wherein the install time calculation expression comprises at least a combination of the timing parameter and the timing coefficient associated with the timing parameter; and
storing the install time calculation expression as part of an installation unit, wherein the installation unit is executed for installing the product in a non-test operating environment.

15. The method of claim 11, further comprising:
responsive to determining to install the product in a non-test operating environment in accordance with the installation operation, selecting a first of a plurality of predetermined install time calculation expressions that comprises at least a combination of the timing parameter and the corresponding timing coefficient based, at least in part, on the installation operation in accordance with which to install the product in the non-test operating environment;
determining a current value of the timing parameter based on execution of the timing parameter test operations in the non-test operating environment; and
estimating the install time associated with installing the product in accordance with the installation operation in the non-test operating environment based on the current value of the timing parameter, the timing coefficient, and the first of the plurality of install time calculation expressions.

16. The method of claim 15, wherein said selecting the first of the plurality of predetermined install time calculation expressions comprises:
selecting the first of the plurality of predetermined install time calculation expressions based on the installation operation and a user selected accuracy level associated with estimating the install time.

17. An apparatus comprising:
a processor;
a network interface coupled with the processor; and
a computer readable storage medium having computer usable program code embodied therewith, the computer usable program code executable by the processor to cause the apparatus to:
identify a timing parameter that influences an install time for installing a product on a plurality of sample computing machines in a test environment in accordance with an installation operation;
for each of the plurality of sample computing machines,
determine a test value of the timing parameter for the sample computing machine based on execution of timing parameter test operations associated with the timing parameter;
determine a test value of the install time for the sample computing machine based on execution of the installation operation; and
determine a timing coefficient for the timing parameter based on the test values of the timing parameter and the test values of the install time.

18. The apparatus of claim 17, wherein the computer readable storage medium comprising computer usable program code executable by the processor to cause the apparatus to determine the test value of the install time for each of the plurality of sample computing machines comprises computer usable program code executable by the processor to cause the apparatus to:
for each of the plurality of sample computing machines,
for a predetermined number of iterations, determine an initial test environment install time value based on execution of the installation operation on the sample computing machine; and
calculate an average of the initial test environment install time values to determine the test value of the install time for the sample computing machine.

19. The apparatus of claim 17, wherein the computer readable storage medium further comprises computer usable program code executable by the processor to cause the apparatus to:
generate an install time calculation expression for estimating the install time associated with installing the product in accordance with the installation operation, wherein the install time calculation expression comprises at least a combination of the timing parameter and the timing coefficient associated with the timing parameter.

20. The apparatus of claim 17, wherein the computer readable storage medium further comprises computer usable program code executable by the processor to cause the apparatus to:
responsive to determining to install the product in a non-test operating environment in accordance with the installation operation, select a first of a plurality of predetermined install time calculation expressions that comprises at least a combination of the timing parameter and the corresponding timing coefficient based, at least in part, on the installation operation in accordance with which to install the product in the non-test operating environment;

determine a current value of the timing parameter based on execution of the timing parameter test operations in the non-test operating environment; and estimate the install time associated with installing the product in accordance with the installation operation in the non-test operating environment based on the current value of the timing parameter, the timing coefficient, and the first of the plurality of install time calculation expressions.

* * * * *